Sept. 29, 1931.  C. S. BROWN  1,825,574
SAFETY CLUTCH MEANS FOR IMPLEMENTS OF MOTOR DRIVEN AGRICULTURAL MACHINES
Filed May 21, 1930  2 Sheets-Sheet 1

INVENTOR.
Charles S. Brown
BY
Bodell & Thompson
ATTORNEYS.

Sept. 29, 1931.  C. S. BROWN  1,825,574
SAFETY CLUTCH MEANS FOR IMPLEMENTS OF MOTOR DRIVEN AGRICULTURAL MACHINES
Filed May 21, 1930  2 Sheets-Sheet 2

INVENTOR.
Charles S. Brown
BY
Bodell & Thompson
ATTORNEYS.

Patented Sept. 29, 1931

1,825,574

UNITED STATES PATENT OFFICE

CHARLES S. BROWN, OF SYRACUSE, NEW YORK

SAFETY CLUTCH MEANS FOR IMPLEMENTS OF MOTOR DRIVEN AGRICULTURAL MACHINES

Application filed May 21, 1930. Serial No. 454,256.

This invention relates to motor driven agricultural machines, and has for its object, a particularly simple and efficient and durable means for actuating the work performing implement of the machine, as for instance, the mower knife of a motor mower, by which during the normal operation, the implement is actuated with enough force to perform its work, and by which resistance slightly greater than normal overcomes the driving force and permits a slipping with minimum of sliding friction between the driving and driven parts of the implement driving mechanism.

The invention consists in the novel features and in the combinations and constructions hereinafter set forth and claimed.

In describing this invention, reference is had to the accompanying drawings in which like characters designate corresponding parts in all the views.

Figure 1:
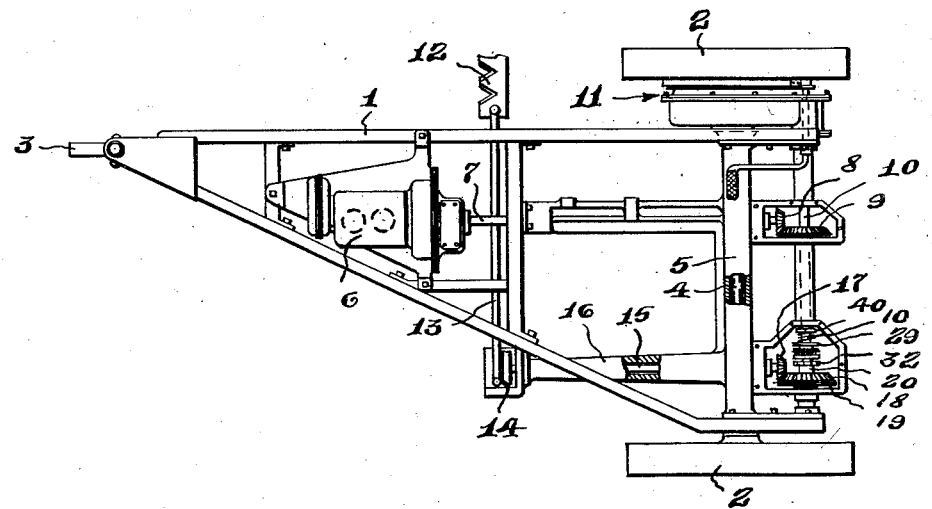
Figure 1 is a plan view, parts being omitted, of a motor mower embodying this invention.
Figure 2:
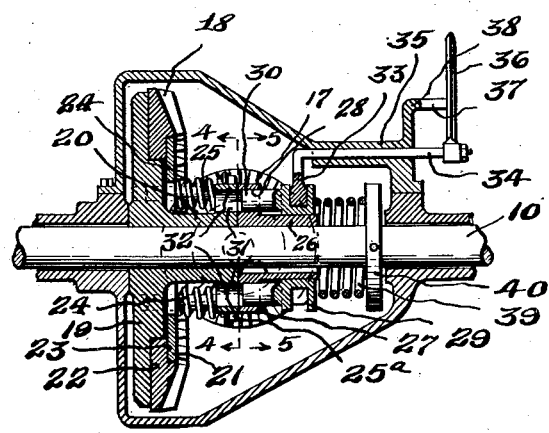
Figure 2 is an enlarged transverse fragmentary sectional view through the friction clutch and contiguous parts.
Figure 3:
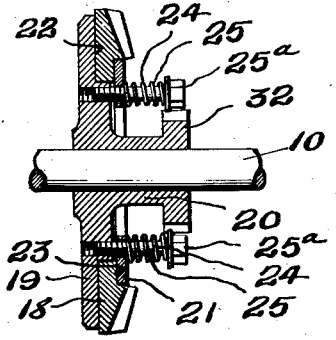
Figure 3 is a detail view of the friction clutch.
Figure 4:
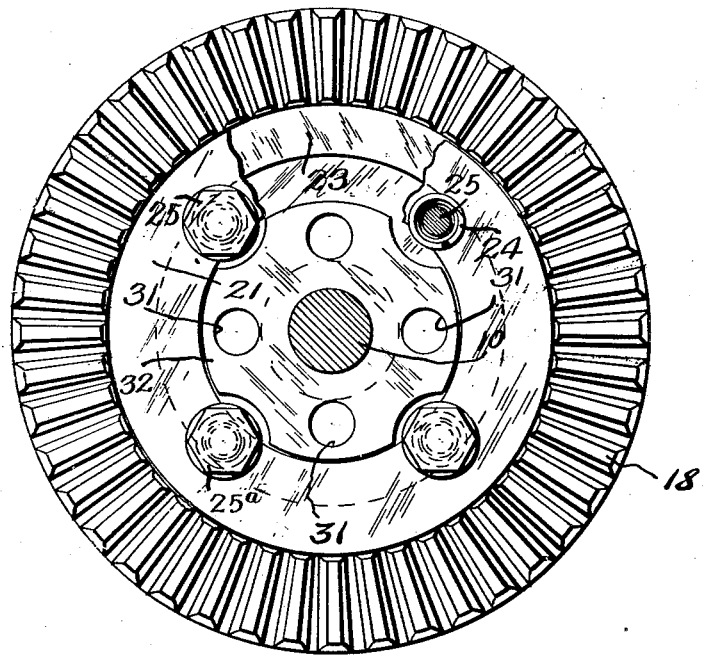
Figures 5, 6:
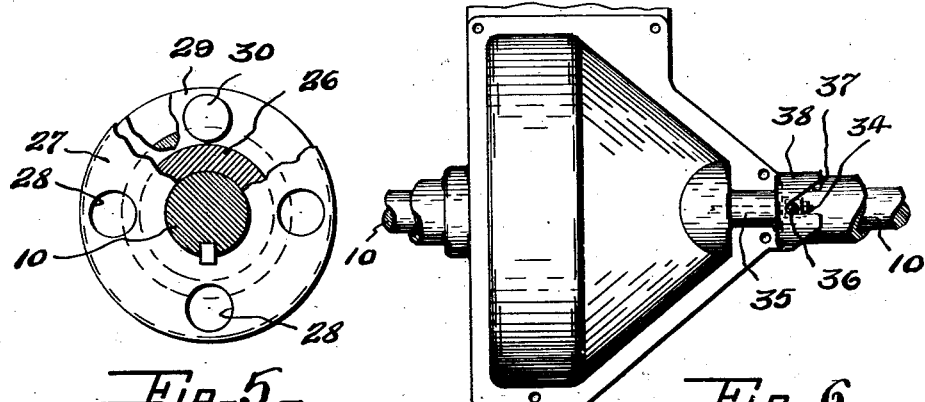

Figures 4 and 5 are enlarged sectional views partly broken away on lines 4—4 and 5—5, Figure 2.

Figure 6 is a plan view of cover over parts seen in Figure 2.

The object of the invention is accomplished by a simple and efficient combination of shafts, gearing and a friction clutch, so arranged that in the normal operation, the tool or implement is actuated through a clutch on a shaft driven at low speed relatively to the speed of the implement drive shaft, the clutch acting upon a large gear on the low speed shaft so that if the implement or mower knife is abnormally obstructed, as when it encounters a stick or stone, the back action on the clutch will be through a small pinion, and the large gear on the low speed shaft with which gear the clutch cooperates, so that the back action is transferred through a great leverage to overcome the driving force of the low speed shaft with a minimum slipping of the clutch.
The invention is here shown as applied to a motor mower, and 1 designates the frame; 2 the ground driving wheels at the rear end of the frame, and 3 a steering or guide wheel at the front end of the frame. The wheels 2 are mounted on an axle 4 suitably supported in the frame, it being shown as extending through a transverse tubular member 5 of the frame. The construction of the frame forms no part of this invention, but forms the subject matter of my copending application, Sr. No. 439,183, filed March 26, 1930.

6 designates a motor, or an internal combustion engine mounted on the frame.

7 is a shaft driven by the motor and having a pinion 8 at its rear end meshing with a gear 9 on a second shaft 10 journalled in suitable bearings at the rear end of the frame, this shaft 10 being connected by a suitable motion transmitting mechanism, designated generally 11, to the wheels 2. This motion transmitting mechanism forms no part of the invention but constitutes the subject matter of another application.

The gear 9 is of larger diameter than the pinion 8 and hence, the shaft 10 is driven through reduction gearing at a considerably lower speed than the engine shaft 7.

12 designates generally, the implement which is a reciprocating knife connected by a pitman 13 to a crank 14 at the end of a drive shaft 15 for the implement, this drive shaft being located in a tubular frame member 16. The shaft 15 has a pinion 17 meshing with a gear 18 of larger diameter on the shaft 10. The ratio of gearing between the pinion 8 and gear 9 is 1 to 4 and between the gear 18 and pinion 17 is usually 4 to 1. The shaft 10 is a low speed drive shaft for the implement driving shaft 15 and is connected to the implement through the geared-up gearing 18, 19.

The gear 18 is connected to the shaft 10 by a friction clutch, here shown as including a section 19 having a hub 20 rotatably mounted on the shaft 10, and a spring pressed section 21 facing against the section 19, and the gear 18 is a ring gear frictionally held between the sections. As here illustrated, the back of the ring gear 18 presses against the bottom of a recess at 22 in the rim of the section 19, and the gear is formed with an annular channel or rabbet 23 in its front face in which the margin of the spring pressed section 21 is located. Thus, the ring gear 18 is normally driven by the friction between it and the sections 19, 21.

The section 21 is pressed against the ring gear 18 by springs 24 encircling studs 25 threading into the section 19 through holes in the section 21, the springs being interposed between shoulders as heads 25ª at the outer ends of the studs and the section 21. The friction clutch is normally connected to the shaft through a releasable clutch of any suitable construction. That here shown includes a hub 26 keyed to the shaft 10 and having a flange 27 formed with holes 28 therein, a shiftable section or slidable collar 29 on the hub having jaws or pins 30 extending into the holes 28 and thus keying the hub and collar together, the pins being shiftable into and out of the holes 31 in a flange 32 on the hub 20 of the friction clutch 19. The collar 29 is shiftable in any suitable manner as by a fork 33 carried by an endwise movable rod 34 slidably mounted in a housing 35 for the clutch, this rod 34 being actuated by a rocking lever 36 mounted on the rod, and coacting with a cam shaped notch 37 in a part 38 forming part of, or fixed to, the housing. The lever 36 is capable of rocking movement about the rod 34, but is held from endwise movement on the rod. Rocking of the lever in one direction forces the lever outwardly as it moves up the incline of the cam shaped notch 37, thus pulling the rod 34 to the right to disengage the clutch or withdraw the pins 30 out of the holes 31 of the flange 32. Movement of the lever 36 in the opposite direction causes the lever to transfer an endwise movement of the rod 34 to the left to engage the pins 30 in the holes 31. Movement of the lever 36 is against the action of a coiled spring 39 interposed between the slidable collar 29 and a collar 40 fixed on the shaft 10. The tension of the springs 24 is initially adjusted by means of the heads 25ª.

In operation, assuming that the pins 30 are in the holes 31, the knife 12 will be actuated with sufficient force to perform its work under normal conditions. If, however, the operation of the knife is stopped, or unduly retarded, as by a stick or stone, the reaction on the clutch will be through the 1 to 4 leverage between the pinion 17 and the gear 18, and hence, the clutch or the ring gear 18 will slip with minimum slippage and with a minimum force above that required to actuate the knife in its normal operation applied backwardly from the shaft 15 to the low speed shaft 10.

Ordinarily clutches, as for instance, automobile clutches, in their general application, are for disconnecting a driving shaft from a driven shaft, but are not intended to slip when under a load, and if they do slip, destructive wear results, and even in an automobile when the transmission gearing is in low gear, no slippage is provided for, and slippage would be detrimental.

My slip clutch, as applied to agricultural machines and the like, is a safety device, and more than an ordinary driving device. The clutch is so placed that it will transmit driving power to the work or knife, and will also readily slip with minimum wear in case the work performing implement or knife is blocked by foreign matter, sticks, stones, etc.

What I claim is:

1. In a motor vehicle of the class described having ground driving wheels, and a reciprocating work performing implement, a motor, motion transmitting means between the motor and the ground wheels and the implement, the motion transmitting means for driving the implement comprising a low speed drive shaft, and a high speed driven shaft, the latter being connected to the implement, and a gear of large diameter on the low speed shaft, and a pinion of smaller diameter on the driven shaft and meshing with said gear, and a friction clutch coacting with the gear of larger diameter adjacent the periphery thereof for connecting and disconnecting the same and the low speed drive shaft, whereby the implement is normally driven through a geared up gearing, and when the implement is obstructed, the back leverage of the pinion on the gear is sufficient to cause the clutch to slip with a minimum slipping force.

2. In a motor vehicle of the class described having driving ground wheels, and a reciprocating work performing implement, a motor, and motion transmitting means between the motor and the ground wheels and the implement including an engine shaft, a second shaft arranged at an angle to the first shaft and connected to the ground wheels, an intermeshing pinion and gear mounted respectively on said shafts, the gear being of larger diameter than the pinion, an implement driving shaft, an intermeshing pinion and gear mounted respectively on the implement driving shaft and the second shaft, the gear being of greater diameter than the pinion, and a friction clutch coacting with said gear adjacent the periphery thereof for connecting the second mentioned gear and its shaft.

3. In a motor vehicle of the class described a frame, a steering wheel at the front end of the frame, driving ground wheels at the rear end of the frame, a reciprocating work performing implement, a motor mounted on the front portion of the frame, a shaft journalled in the frame and extending transversely thereof, and on which the ground wheels are mounted, a second shaft extending transversely of the frame in the rear of the first shaft, motion transmitting means between the second shaft and the ground wheels, a third shaft extending lengthwise of the frame and connected to the motor at its front end, motion transmitting means between the third shaft and the second shaft, a fourth shaft journalled in the frame and extending lengthwise thereof, connections between the forward end of the fourth shaft and the implement to reciprocate said implement, geared up gearing between the rear end of the fourth shaft and the second shaft, and a friction clutch between the second shaft and the larger gear associated with the second shaft and coacting with the larger gear near the periphery thereof to cause the same to slip relatively to the second shaft when the implement is subjected to abnormal restraint.

4. In a motor vehicle of the class described having a frame, a steering wheel at the front end of the frame, driving ground wheels at the rear of the frame, a reciprocating work performing implement, a motor and motion transmitting means between the motor and the ground wheels and the implement including an engine driven shaft extending lengthwise of the frame, a second shaft extending transversely of the rear end of the frame and on the ends of which the ground wheels are mounted, a third shaft extending transversely of the frame in the rear of the second shaft, motion transmitting mechanism between the third shaft and the ground wheels, a pinion mounted on the rear end of the engine driven shaft, a gear of larger diameter than the pinion mounted on the third shaft and meshing with the pinion, a fourth shaft journalled in the frame and extending lengthwise thereof, connections between the front end of the fourth shaft and the implement to reciprocate said implement, a pinion mounted on the rear end of the fourth shaft, a gear mounted on the third shaft and meshing with the last mentioned pinion, and a friction clutch connecting the third shaft and the last mentioned gear.

5. In a motor mower of the class described having driving wheels and a continuously operating cutter of the type having a reciprocating knife coacting with a finger bar, a motor, and motion transmitting means between the motor and the drive wheels and the cutter comprising a low speed jack shaft, a high speed cutter shaft, motion transmitting means between the cutter shaft and the cutter to actuate the latter, geared-up gearing between the low speed jack shaft and the high speed cutter shaft, and friction yielding spring pressed means for transmitting the motion of the jack shaft to the larger gear of the gearing, said means acting on the larger gear near the periphery thereof, whereby it is instantly releasable to disconnect the larger gear of the gearing from the jack shaft when the reciprocating knife encounters abnormal resistance, and the force thereof is transferred through the smaller gear to the larger.

6. In a motor mower, a frame having driving wheels and a continuously reciprocating cutter of the finger type, a motor, motion transmitting means between the motor and the drive wheels and the cutter, including a low speed jack shaft, a high speed cutter shaft, motion transmitting means between the cutter shaft and the cutter to reciprocate the latter, a differential gearing connected with the drive wheels, and motion transmitting parts between the jack shaft and the differential gearing, spaced gear mechanisms on said jack shaft, one of said gear mechanisms being a reduction gearing and having driving connection with said motor, and the cutter shaft having driving connection with the jack shaft through the other of said gear mechanisms, the latter gear mechanisms being a step up gearing, and friction means to operatively connect the larger gear of the gearing to the jack shaft, and to instantly relieve said larger gear and the cutter of the momentum weight of the jack shaft and parts associated therewith and connected thereto when the cutter encounters an abnormal resistance, and the force thereof is transferred back to the larger gear through the smaller gear of the gear mechanism which connects the jack shaft and the cutter shaft.

In testimony whereof, I have hereunto signed my name, at Syracuse, in the county of Onondaga, and State of New York, this 15th day of May, 1930.

CHARLES S. BROWN.